United States Patent
Kreuter

(10) Patent No.: US 10,415,844 B2
(45) Date of Patent: Sep. 17, 2019

(54) LOW POWERED PNEUMATIC CONTROL CONVERTER

(71) Applicant: KMC Controls, Inc., New Paris, IN (US)

(72) Inventor: Paul E. Kreuter, Goshen, IN (US)

(73) Assignee: KMC Controls, Inc., New Paris, IN (US)

( * ) Notice: Subject to any disclaimer, the term of this patent is extended or adjusted under 35 U.S.C. 154(b) by 119 days.

(21) Appl. No.: 15/584,702

(22) Filed: May 2, 2017

(65) Prior Publication Data

US 2018/0320914 A1    Nov. 8, 2018

(51) Int. Cl.
   F24F 11/72    (2018.01)
   G05D 23/19    (2006.01)
   F24F 11/76    (2018.01)

(52) U.S. Cl.
   CPC .......... *F24F 11/76* (2018.01); *G05D 23/1925* (2013.01)

(58) Field of Classification Search
   CPC . F24F 11/72; F24F 11/74; F24F 11/76; G05D 23/12; G05D 23/127; G05D 23/185; G05D 23/1919; G05D 23/1925; G05B 19/44; G05B 2219/31119
   USPC ...................................... 236/1 F; 251/129.04
   See application file for complete search history.

(56) References Cited

U.S. PATENT DOCUMENTS

| 3,718,280 | A | * | 2/1973 | Russell | F24F 11/00 |
| | | | | | 236/44 R |
| 4,077,567 | A | * | 3/1978 | Ginn | F24F 11/74 |
| | | | | | 236/49.4 |
| 4,957,238 | A | | 9/1990 | Kreuter | |
| 8,527,099 | B2 | | 9/2013 | Songukrishnasamy et al. | |
| 2011/0166712 | A1 | | 7/2011 | Kramer et al. | |

OTHER PUBLICATIONS

PCBMotor APS, PCBMotor Design Guidelines, Jun. 1, 2010, published at www.pcbmotor.com.
Cypress Envirosystems, Wireless Pneumatic Thermostat (WPT), 2008.
Johnson Controls, WR-4000 Series Pneumatic-to-Direct Digital Control (DDC) Room Thermostats, Nov. 1, 2013.

* cited by examiner

*Primary Examiner* — Seth W. Mackay-Smith
(74) *Attorney, Agent, or Firm* — Shewchuk IP Services, LLC; Jeffrey D. Shewchuk

(57) ABSTRACT

A pneumatic control converter, preferably acting as a pneumatic thermostat, includes a pneumatic section, and electronic section and a piezo electric linkage section. A piezo electric rotary motor drives a rotary cam, with a cam follower linked via a W-shaped flexure linkage to bias the ball nozzle which controls the pneumatic control output pressure. The input to the piezo electric rotary motor is an electrical signal dependent upon electronically sensed pressure relative to the programmed set point. The pneumatic control converter consumes little electrical energy and is preferably battery powered, and the pneumatic control output pressure can be maintained even in the absence of electric power.

21 Claims, 3 Drawing Sheets

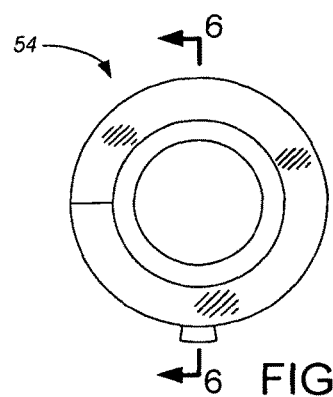 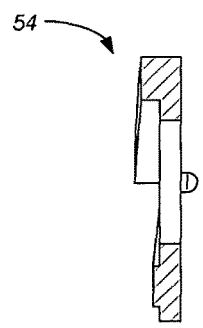 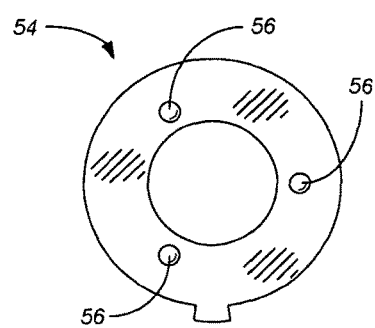
FIG. 4　　FIG. 6　　FIG. 5
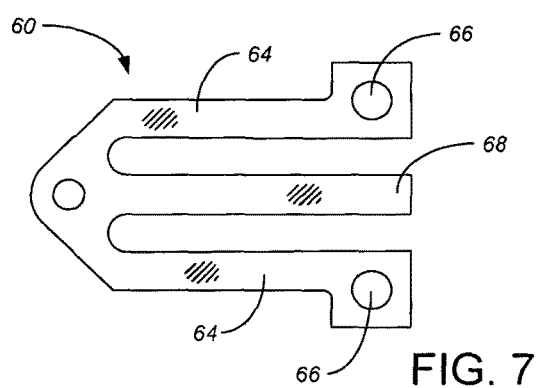
FIG. 7

LOW POWERED PNEUMATIC CONTROL CONVERTER

CROSS-REFERENCE TO RELATED APPLICATION(S)

None.

BACKGROUND OF THE INVENTION

The present invention relates generally to the field of pneumatic control devices and systems, and more particularly to pneumatic thermostats used to vary a pressure or flow control signal in a pneumatic system based upon a sensed temperature.

Many systems are pneumatically controlled based on a gas (generally air) flow or pressure. Pneumatic control systems tend to be simple and robust, operating over a wide range of temperature and other environmental conditions, and have long working lives. Pneumatic control systems reduce the likelihood of fires, because air is non-flammable. Pneumatic control systems pose no danger of electric shock, present no possible failure mode due to electrical short circuiting, and are relatively unaffected by electro-static discharge. Pneumatic control systems are mechanical devices that may avoid the need for a power source (in short or long term), thereby reducing wiring requirements, and may be unaffected by electricity fluctuations or power outage. Pneumatic control systems are environmentally friendly, as leakages in the system do not negatively affect the outside environment or cause pollution.

The pneumatic control signal can be determined on any number of sensed input parameters, with a commonly sensed input being temperature, in which case the pneumatic control device is commonly called a pneumatic thermostat. Pneumatic thermostats convert a substantially constant pressure air supply into a pressurized air signal indicative of sensed ambient temperature. Pneumatic thermostats are used in many pneumatic systems, with a common use being to control variable air volume (VAV) units (such as disclosed in U.S. Pat. No. 4,957,238, incorporated by reference), ventilators, radiators, coil units, fans, dampers, valves and the like in heating, ventilation, air conditioning (HVAC) systems. Pneumatic thermostats are still reliable workhorses that control temperature in many older buildings across the country.

One example of a pneumatic thermostat is shown in U.S. Pat. Pub. No. 2011/0166712, incorporated by reference, which combines a valve unit (typically a diaphragm type valve), a "flapper" controlled nozzle, and a bimetallic strip. Supply air is passed through the valve unit, which controls the pressure at an outlet, after allowing a portion of the supply air to exit into the atmosphere through the flapper-controlled nozzle. The bimetallic strip is linked to the flapper, and the position of the flapper over the control nozzle (and hence the outlet pressure) moves responsive to changes in temperature witnessed by the bimetallic strip. While pneumatic thermostats such as described in U.S. Pat. Pub. No. 2011/0166712 provide certain advantages, they tend to have reduced accuracy particularly associated with the bimetallic strip.

Largely separate from the pneumatic thermostat industry, the field of piezo electrics is becoming more well-known. Piezo electrics are advantageous in that the power consumption is low. One of the rare instances in which piezo electrics are applied to a pneumatic thermostat is shown in U.S. Pat. No. 8,527,099, which teaches an embodiment using a piezo electric device as a prime mover controlled by a bimetallic strip based pneumatic thermostat.

BRIEF SUMMARY OF THE INVENTION

The present invention is a low powered pneumatic control converter which produces a pneumatic control signal using as little power consumption as possible and in as small a package as possible. The pneumatic control converter is primarily envisioned to act as a pneumatic thermostat, in which accuracy (particularly at low temperature) is improved by using a temperature sensor which outputs an electronic value, and the pneumatic control converter changes that sensed electronic value into a pneumatic control. The pneumatic control converter utilizes a piezo electric rotary motor which powers a mechanical linkage to adjust the ball nozzle which controls the pneumatic control output pressure. The preferred mechanical linkage includes a rotary cam pushing a cam follower against a spring flexure, with an opposing arm of the spring flexure biasing the position of the ball nozzle.

BRIEF DESCRIPTION OF THE DRAWINGS

FIG. 4 is a top plan view of the preferred rotary cam.

FIG. 5 is a bottom plan view of the preferred rotary cam.

FIG. 6 is a cross-sectional view of the preferred rotary cam of FIGS. 1-5 taken along lines 6-6 in FIG. 4.

FIG. 7 is a plan view of the preferred flexure linkage.

While the above-identified drawing figures set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

Figure 1:
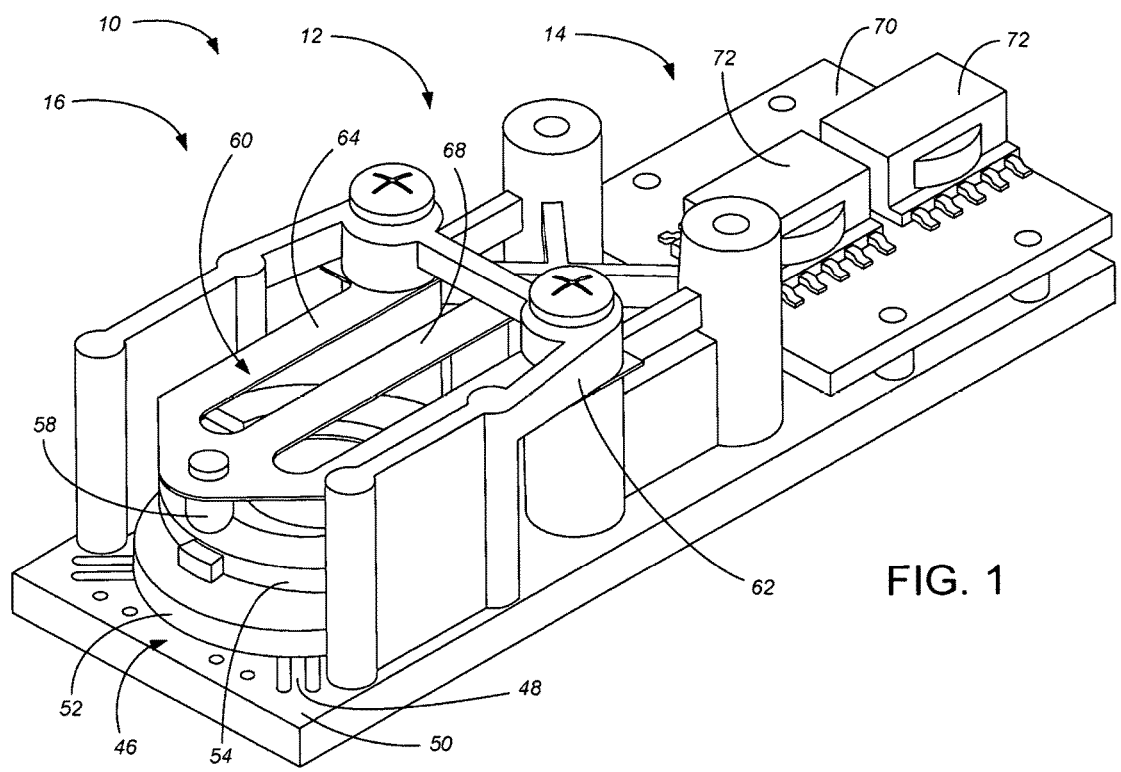
FIG. 1 is a perspective view depicting a preferred pneumatic control converter in accordance with the present invention, shown without its housing or cover/display.
Figure 2:
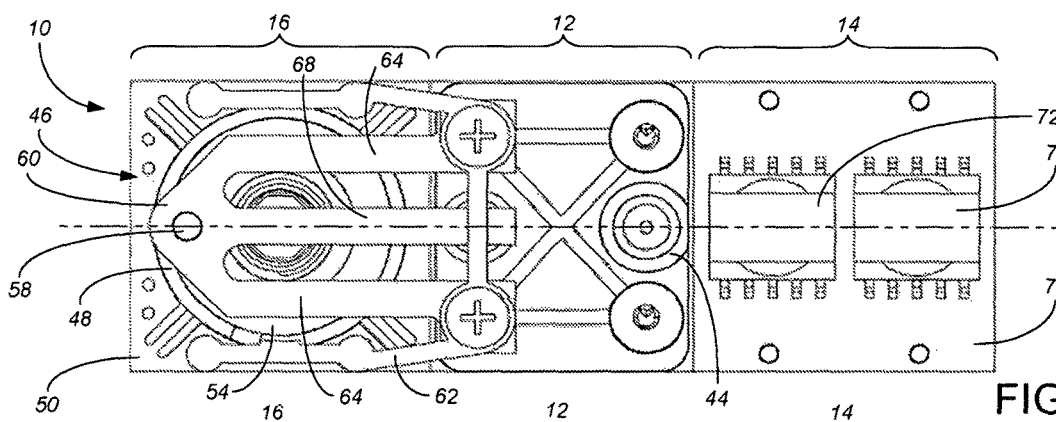
FIG. 2 is a top plan view of the pneumatic control converter of FIG. 1.
Figure 3:
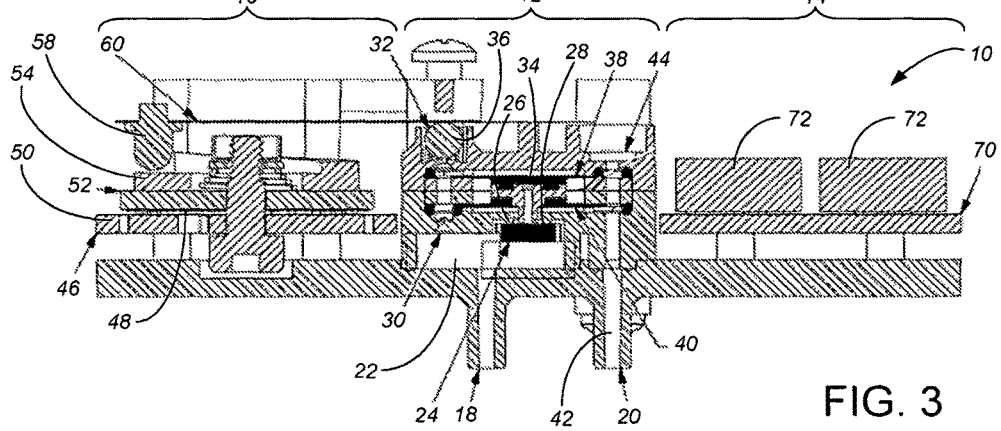
FIG. 3 is a cross-sectional view of the pneumatic control converter of FIG. 1 taken along lines 3-3 in FIG. 2.

A preferred embodiment of a low powered pneumatic control converter 10 in accordance with the present invention is shown in FIGS. 1-3. In general, the pneumatic control converter 10 includes three sections, a pneumatic section 12 which in this embodiment is positioned between an electronic section 14 and a piezo electric linkage section 16. The positioning of the electronic section 14 is in particular adjustable to fit whatever package is desired.

The pneumatic section 12 is largely similar to prior pneumatic thermostat controllers, such as the two-pipe single set point pneumatic room thermostats available from KMC Controls of New Paris, Ind. under model numbers CTC-1621 and CTC-1622. On the back or bottom side, the pneumatic section 12 includes a main or supply air port 18 and a branch or output port 20. In the preferred embodiment, each of the supply air port 18 and the branch port 20 support 3/32 inch (2.5 mm) inner diameter tube fittings. In use, the supply air port 18 is connected in fluid communication to the pneumatic power (pressurized air source) within the building, typically with a supply pressure in the 20-30 psig (138-207 kPa) range. A controlled device, typically a valve or damper actuator, is connected in fluid communication to the branch port 20.

The supply air port 18 feeds to a supply pressure chamber 22 with a valve disc 24, with main and exhaust valve seats 26, 28 on its upper surface. A restrictor 30 is positioned between the supply pressure chamber 22 and a signal chamber 34, with the signal chamber 34 having a ball/signal nozzle 32 which vents to ambient/atmosphere. The restrictor 30 bleeds the air flow to the signal nozzle 32. The pressure then witnessed in the signal chamber 34 depends upon the downward force applied to the ball 36 in the signal nozzle 32. The signal chamber 34 extends over the signal diaphragm 38, such that pressure in the signal chamber 34 pushes downward on the signal diaphragm 38. A branch diaphragm 40 extends over a branch chamber 42, with the signal diaphragm 38 and the branch diaphragm 40 both linked to the valve disc 24. If pressure on the signal diaphragm 38 is greater than pressure on the branch diaphragm 40, the valve disc 24 opens the main valve seat 26 allowing more pressure to build in the branch chamber 42. If pressure on the signal diaphragm 38 is less than pressure on the branch diaphragm 40, the exhaust valve seat 28 opens allowing branch pressure to escape to ambient/atmosphere. In the preferred embodiment, there is also a pressure sensor port 44 exposed on the front or top side of the pneumatic section 12. A pressure sensor (not shown) can then be connected in fluid communication to monitor the branch port pressure at the pressure sensor port 44.

Like prior art pneumatic thermostats, the branch port pressure is controlled over a range of about 3 to 13 psig. Like prior art pneumatic thermostats, the output capacity is about 200 scim (55 mL/s) and the consumption is about 20 scim (5.5 mL/s).

In the piezo electronic section 16 of the pneumatic control converter 10, a piezo electronic rotary motor 46 is provided and makes up the general footprint of the piezo electronic section 16. A preferred piezo electronic rotary motor 46 includes a surface mounted stator 48 on a piezo electronic printed circuit board 50 and a rotor 52 rotationally mounted immediately above the stator 48. In the preferred embodiment, the stator 48 and rotor 52 are each about 0.8 inches (20 mm) in diameter. Such piezo electronic rotary motors are available from PCBMotor ApS of Ballerup, Denmark.

A rotary cam 54, best shown in FIGS. 4-6, is mounted to the rotor 52 of the piezo electronic rotary motor 46. Three mounting extensions 56 are included on the bottom side of the rotary cam 54 for easier attachment, positioning and torque transfer from the rotor 52 to the rotary cam 54. The preferred cam 54 has an inner diameter of about ⅜ inches (9.5 mm) and an outer diameter of about ¾ inches (19 mm), with the cam surface extending from about a ½ inch (13 mm) inner diameter to a ¾ inch (19 mm) outer diameter. The preferred cam 54 is molded out of polycarbonate, but any substantially rigid material will suffice, provided the material can minimize friction between the cam 54 and a cam follower 58 to an acceptable level for a smooth transfer from rotational position of the cam 54 to elevation of the cam follower 58.

The flexure linkage 60, shown individually in FIG. 7, is mounted immediately above the rotary cam 54, with the cam follower 58 biased downward onto the cam surface of the cam 54. In the preferred embodiment, the mounting arrangement 62 for the flexure linkage 60 ensures a carefully controlled elevation and angle of the flexure linkage 60 relative to the cam 54, while protecting the flexure linkage 60 and the piezo electric motor 46 from inadvertent contact or damage.

The flexure linkage 60 acts as a spring mechanism, translating the elevation of the cam follower 58 into a downward force on the ball 36 of the signal nozzle 32 in the pneumatic section 12. To achieve the desired spring action, the flexure linkage 60 is preferably formed of a shape retaining elastic spring material, which (unlike prior art bimetal strips) does not flex based upon temperature, but rather flexes to provide a spring force which is generally temperature insensitive and only based on the position of the rotary cam 54. In the preferred embodiment, the flexure linkage 60 is stamped out of 0.005 inch (0.13 mm) thick ¾ hardness 301 stainless steel sheet material. The preferred flexure linkage 60 has a W-shape, with the outer legs 64 of the W-shape having mounting openings 66. The outer legs 64 of the flexure linkage 60 are about ⅛ inches (3 mm) wide and almost 1 inch (24 mm) long, providing a spring force which biases the cam follower 58 downward but allows the cam follower 58 to change its elevation by the amount of the entire change of elevation of the cam surface. The center leg 68 of the W-shape is similarly about ⅛ inches (3 mm) wide and almost 1 inch (24 mm) long. When the cam follower 58 moves upward due to rotation of the cam 54 and rotor 52, the outer legs 64 of the flexure linkage 60 act as elastic beams which curve under bending stress, changing the angle of the bottom of the W-shape (near the cam follower 58) relative to the mounting angle of the flexure linkage 60. This changing of the angle of the bottom of the W-shape in turn causes the opposite end of the center leg 68 to push downward, i.e., the more the cam follower 58 raises the bottom of the W-shape, the harder the center leg 68 pushes the ball 36 of the signal nozzle 32 downward.

The preferred cam 54 has a lift within a range of 0.02 to 0.5 inches (0.5 to 13 mm), with the most preferred lift being about 0.075 inches (2 mm). The cam 54 has a total throw during operation (from lowest to highest achievable branch pressure) which is less than 360°, and more preferably within the range of 180 to 360°, with the most preferred total throw being about 340°, such that positioning of the rotor 52 across about a 340° rotational range changes the cam follower elevation by about 0.075 inches (2 mm). The preferred translation from rotational position to cam height is linear, i.e., each 1° of rotation of the rotor 52 changes the elevation of the cam follower 58 by an equal amount, but alternative embodiments permit a curvature to the cam surface so different circumferential positions have different sensitivities.

The preferred arrangement, with the motor 46, cam 54 and flexure linkage 60 as described, is believed to be more precise and consistent than the downward spring force provided by temperature induced flexing of the bimetal strip in prior art pneumatic thermostats. The precision and consistency is believed to exist across a wide range of temperatures, altitudes, humidities and mounting orientations, over years or decades of life. Using a stainless steel sheet material for the spring 60 helps minimize any corrosion or change in spring force across the years of life of the pneumatic control converter 10. The cam 54 and the flexure linkage 60 are particularly inexpensive and relatively simple to manufacture.

In the electronics section 14 of the pneumatic control converter 10, a driver board 70 is mounted for supporting electronic components on a printed circuit board, such as the driver chips 72 and other electronic components (not shown). For instance, the driver board 70 may include the pressure sensor, if an electronic value of sensed pressure is desired. The driver board 70 may also include a temperature sensor having an electronic output, as well as a microcontroller to convert the sensed electronic output of the temperature sensor into an electronic control signal for the piezo-electronic rotary motor 46. The driver board 70 may also include communication electronics, permitting wired or wireless communication with the microcontroller. Such communication electronics may permit remote monitoring of temperature and branch pressure, automatic setpoint changes based on time-of-day schedule and night setback, and/or automatic calibration for setpoint offsets. Alternatively, the pressure sensor electronics, the temperature sensor electronics, the microcontroller chip/electronics and/or the communication electronics may be housed on a separate controller board (not shown). The preferred embodiment includes a power supply, which may be electronic components to smooth or control electric building power (such as either 120V AC or 24 V DC), but more preferably includes a battery (not shown) and electronic components to control/smooth the battery output.

The present invention is preferably housed in a package which is aesthetically pleasing for mounting in a building, similar to prior art pneumatic thermostats. For instance, the preferred embodiment fits within a cover (not shown) which has dimensions of about 5⅛ inches (130 mm)×3½ inches (89 mm)×1 7/16 inches (37 mm). The cover may include a door and a mounting arrangement for one or more batteries. The cover may also include a display, such as for displaying the sensed temperature or other information, as well as an input device such as for changing the setpoint temperature or throttling range. For optimum performance, the pneumatic control converter 10 when used as a thermostat should be mounted on an interior wall and away from heat sources, sunlight, windows, air vents, and air circulation obstructions (e.g., curtains, furniture). Units may be mounted horizontally or vertically to either a 2"×4" electrical box or a hollow wall.

The accuracy of the preferred pneumatic control converter 10 is more than sufficient for pneumatic control, and is usually limited by the accuracy of the temperature sensor and its electronic output rather than the accuracy of either the piezo-electric motor or the cam 54 and flexure linkage 60. For instance, a preferred embodiment has a setpoint temperature range of 55° F. to 85° F. in 1° F. increments. The preferred temperature sensor is connected with a 10 bit A/D register providing a resolution of about 0.16° F. The preferred embodiment has a sensitivity which is controllable over a range of 2-12 psi/° F., i.e., its most needed resolution/greatest number of steps is at 2 psi/° F. where each 0.16° F. temperature change results in 0.32 psi output pressure change. From minimum (1 psig) to maximum (20 psig) output pressure, the 0.32 psi/step resolution results in about 60 different steps from minimum to maximum output pressure. With 340° of possibly cam rotation provided in 60 steps, the highest needed resolution for each differently sensed temperature is 5°-6° of cam rotation. Due to the limits of the temperature sensor and sensitivity settings, no greater fidelity is required. However, it should be noted that the piezo electric motor and cam arrangement allows much greater fidelity and accuracy if needed for using the pneumatic control converter 10 for other applications. High resolution piezo electric motors available from PCBMotor ApS with encoders have sensitivities from 200 to 800 lines per 360° revolution, and micropulsing can be used to increase the resolution to as small as 1/2,500,000 of a revolution.

In embodiments that include a pressure sensor, the difference between the setpoint temperature and the sensed temperature can be combined with the input throttling range to have the microcontroller compute what the output pressure should be. The pneumatic control converter 10 then measures the output pressure electronically and compare this to the desired pressure. The position of the rotor 52 and cam 54 is then adjusted to cause the pneumatic valve to put out the desired pressure. Embodiments that include a pressure sensor are particularly beneficial if there is any wear or change in the performance of the ball 36 in the signal nozzle 32 over time or based on operating conditions (operating temperature, humidity, elevation, etc.).

An alternate arrangement might replace the cam 54 with a lead screw and nut assembly. This would provide linear motion which could move the input of the flexure. A benefit of using a lead screw in place of the cam/cam follower is that the rotation of the cam 54 is limited to a value less than 360°, whereas the lead screw can be rotationally advanced over a number of 360° turns, allowing even less precision of the piezo electric motor. Another alternate arrangement would use a compression spring, a tension spring or a leaf spring acting on the ball 36 of the signal nozzle 32 rather than the preferred flexure 60.

The preferred embodiment uses a piezo electric motor 46 instead of a stepper motor to reduce power consumption. In the case of the thermostat application, the pneumatic control converter 10 is a battery powered device, where low power consumption is a necessity. The main valve arrangement of the preferred embodiment is such that it can supply a continuous flow of air if the control device is consuming air even while the piezo electric motor 46 is unpowered. The preferred embodiment is believed to provide a battery life, in most applications, of about 2 years or more.

Although the present invention has been described with reference to preferred embodiments, workers skilled in the art will recognize that changes may be made in form and detail without departing from the spirit and scope of the invention.

The invention claimed is:
1. A pneumatic control converter comprising:
a pneumatic section comprising:
  a supply air port for receiving pressurized air;
  a branch port for outputting a pneumatic control signal via air at a controlled pressure less than the pressurized air; and
  a valve arrangement between the supply air port and the branch port, the valve arrangement controlling pressure transfer from the supply air port to the branch port based upon a position of a control member; and
a piezo electric linkage section, comprising:
  a piezo electric motor moving an output member based on an electrical input signal, wherein the piezo electric motor is a rotary motor having a stator and a rotor; and
  a linkage between the output member and the control member of the valve arrangement in the pneumatic section, wherein the linkage comprises:
    a rotary cam mounted on the rotor of the rotary motor;
    a cam follower which changes elevation based on the rotational position of the rotary cam; and
    a spring transferring the elevation of the cam follower into a force biasing the position of the control member.

2. The pneumatic control converter of claim 1, further comprising an electronic section having battery powered components providing the electrical input signal to the piezo electric motor.

3. The pneumatic control converter of claim 1, wherein the spring has a W-shape, with outer legs of the W-shape being mounted, with the cam follower positioned in the bottom of the W-shape, and with a center leg of the W-shape biasing the control member.

4. The pneumatic control converter of claim 1, wherein the cam comprising a ramp surface upon which the cam follower rides, with the elevation where the cam follower contacts the ramp surface changing as a linear function of the rotational position of the rotary cam.

5. The pneumatic control converter of claim 4, wherein the cam is molded of plastic, with the elevation where the cam follower contacts the ramp surface changing within a range of 0.02 to 0.5 inches.

6. The pneumatic control converter of claim 1, wherein the cam has a total throw during operation, from lowest to highest achievable branch pressure, which is within the range of 180 to 360°.

7. The pneumatic control converter of claim 1, wherein the linkage comprises a spring member which flexes based upon position of the output member, with the amount of flexing controlling a spring force biasing the position of the control member.

8. The pneumatic control converter of claim 7, wherein the spring is formed of sheet metal.

9. The pneumatic control converter of claim 7, wherein the spring is formed of stainless steel.

10. The pneumatic control converter of claim 1, wherein the control member of the pneumatic section is a ball of a nozzle arrangement venting a signal chamber.

11. The pneumatic control converter of claim 1, wherein the pneumatic section further comprises a pressure sensing port, and wherein the pneumatic control converter further comprises an electronic section, with pressure sensed at the pressure sensing port being an input to the electronic section for generating an electronic signal driving the piezo electric motor.

12. The pneumatic control converter of claim 1, wherein the spring is formed of shape retaining elastic spring material which does not flex based upon temperature.

13. A pneumatic control converter comprising:
a pneumatic section comprising:
   a supply air port for receiving pressurized air;
   a branch port for outputting a pneumatic control signal via air at a controlled pressure less than the pressurized air; and
   a valve arrangement between the supply air port and the branch port, the valve arrangement controlling pressure transfer from the supply air port to the branch port based upon a position of a control member; and
a piezo electric linkage section, comprising:
   a piezo electric motor moving an output member based on an electrical input signal; and
   a linkage between the output member and the control member of the valve arrangement in the pneumatic section, wherein the linkage comprises a spring member which flexes based upon position of the output member, with the amount of flexing controlling a spring force biasing the position of the control member, and further comprising a support for the spring, the support at least partially surrounding the spring and protecting the spring from inadvertent contact.

14. The pneumatic control converter of claim 13, wherein the piezo electric motor is a rotary motor having a stator and a rotor.

15. The pneumatic control converter of claim 14, wherein the linkage comprises:
   a rotary cam mounted on the rotor of the rotary motor;
   a cam follower which changes elevation based on the rotational position of the rotary cam;
   a spring transferring the elevation of the cam follower into a force biasing the position of the control member.

16. A pneumatic control converter comprising:
a pneumatic section comprising:
   a supply air port for receiving pressurized air;
   a branch port for outputting a pneumatic control signal via air at a controlled pressure less than the pressurized air; and
   a valve arrangement between the supply air port and the branch port, the valve arrangement controlling pressure transfer from the supply air port to the branch port based upon a position of a control member; and
a linkage providing a biasing force influencing the position of the control member in the valve arrangement, the linkage comprising a spring formed of shape retaining elastic spring material which does not flex based upon temperature.

17. The pneumatic control converter of claim 16, wherein the spring has a W-shape, with outer legs of the W-shape being mounted, and with a center leg of the W-shape biasing the control member.

18. The pneumatic control converter of claim 17, further comprising a piezo electric motor moving an output member based on an electrical input signal, with position of the output member being linked to a bottom of the W-shape of the spring, such that position of the output member controls the amount of flexing of the spring.

19. The pneumatic control converter of claim 18, further comprising an electronic section having battery powered components providing the electrical input signal to the piezo electric motor.

20. The pneumatic control converter of claim 16, further comprising:
   a rotary motor having a stator and a rotor;
   a rotary cam mounted on the rotor of the rotary motor; and
   a cam follower which changes elevation based on the rotational position of the rotary cam;
wherein the linkage transfers the elevation of the cam follower into a force biasing the position of the control member.

21. The pneumatic control converter of claim 19, further comprising an electronic section having battery powered components providing an electrical input signal to the rotary motor.

* * * * *